(12) United States Patent
Imayama et al.

(10) Patent No.: US 7,009,664 B2
(45) Date of Patent: Mar. 7, 2006

(54) LIQUID CRYSTAL DISPLAY DEVICE WITH ORGANIC PROTECTIVE FILM WHICH STRUCTURE CONNECTING AROUND SEALING MATERIAL

(75) Inventors: Hirotaka Imayama, Mobara (JP); Ryutaro Oke, Mobara (JP); Takahiro Ochiai, Mobara (JP); Kikuo Ono, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/960,027

(22) Filed: Oct. 8, 2004

(65) Prior Publication Data

US 2005/0062898 A1    Mar. 24, 2005

Related U.S. Application Data

(62) Division of application No. 10/284,406, filed on Oct. 31, 2002, now Pat. No. 6,819,389.

(30) Foreign Application Priority Data

Dec. 3, 2001   (JP) .............................. 2001-368076

(51) Int. Cl.
*G02F 1/136* (2006.01)
*G02F 1/1333* (2006.01)
*G02F 1/1339* (2006.01)

(52) U.S. Cl. ..................... 349/43; 349/138; 349/149; 349/153

(58) Field of Classification Search ............. 349/42–44, 349/122, 138, 149–153; 257/59, 72
See application file for complete search history.

(56) References Cited

U.S. PATENT DOCUMENTS

| 4,068,923 | A | | 1/1978 | Toida ........................... 349/110 |
|---|---|---|---|---|
| 5,739,880 | A | | 4/1998 | Suzuki et al. ................. 349/153 |
| 5,745,208 | A | | 4/1998 | Grupp et al. ................. 349/122 |
| 5,852,485 | A | | 12/1998 | Shimada et al. ............. 349/141 |
| 5,858,482 | A | | 1/1999 | Ishiwata et al. ............. 349/138 |
| 5,889,573 | A | * | 3/1999 | Yamamoto et al. ........... 349/152 |
| 6,049,365 | A | * | 4/2000 | Nakashima ................... 349/42 |
| 6,061,105 | A | * | 5/2000 | Nakagawa ..................... 349/40 |
| 6,104,462 | A | | 8/2000 | Kurosaki et al. ............ 349/110 |
| 6,429,917 | B1 | | 8/2002 | Okamoto et al. ........... 349/132 |
| 2002/0122143 | A1 | | 9/2002 | Woo et al. ..................... 349/42 |
| 2002/0167634 | A1 | | 11/2002 | Watanabe et al. ............ 349/153 |
| 2003/0071955 | A1 | | 4/2003 | Nakayoshi et al. .......... 349/154 |

FOREIGN PATENT DOCUMENTS

| JP | 64-77024 | 9/1987 |
|---|---|---|
| JP | HEI 9-230378 | 2/1996 |
| JP | 2001-133787 | 10/1999 |
| JP | 2001-264793 | 3/2000 |

* cited by examiner

*Primary Examiner*—Tarifur R. Chowdhury
(74) *Attorney, Agent, or Firm*—Reed Smith LLP; Stanley P. Fisher, Esq.; Juan Carlos A. Marquez, Esq.

(57) ABSTRACT

There is provided a TFT liquid crystal display device in which the adhesion strength of a sealing material is high and the reliability of its terminals is high. In a peripheral area of the liquid crystal display device, an organic protective film underlying the area of the sealing material is collectively removed together with an inorganic protective film, and video signals are respectively led from drain lines of a display area in such a manner that the respective drain lines are temporarily connected to gate lines underlying an insulating film under the sealing material.

2 Claims, 9 Drawing Sheets

LIQUID CRYSTAL DISPLAY DEVICE WITH ORGANIC PROTECTIVE FILM WHICH STRUCTURE CONNECTING AROUND SEALING MATERIAL

This application is a Divisional of U.S. Ser. No. 10/284,406 filed Oct. 31, 2002 now U.S. Pat. No. 6,819,389. Priority is claimed based on U.S. Ser. No. 10/284,406 filed Oct. 31, 2002, which claims priority to Japanese Patent Application No. 2001-368076 filed on Dec. 3, 2001.

BACKGROUND OF THE INVENTION

The present invention relates to a liquid crystal display device and, more specifically, to an active matrix type liquid crystal display device of a thin film transistor (TFT) type or the like and a manufacturing method for the same.

Two types of liquid crystal display devices are mainly used: one is a so-called vertical electric field type in which electrodes are disposed on the liquid-crystal-layer side of each of two substrates disposed in opposition to each other with a liquid crystal layer interposed therebetween; and the other is a lateral electric field type (in-plane-switching mode: IPS mode) in which lateral electric fields having components parallel to upper and lower substrates are applied to a liquid crystal gap therebetween. In either type, alignment films for controlling the initial alignment of liquid crystal molecules are respectively formed on the surfaces of the mutually opposed substrates that are closest to a liquid crystal layer, and the liquid crystal layer is sealed on four sides by a sealing material.

An area in which the sealing material is formed is called a peripheral area or a peripheral portion in contrast with an effective display area in which pixels are formed, and lines are led to a terminal portion through a layer underlying the sealing material on at least one side of the peripheral portion.

Japanese Patent Laid-Open Nos. 133787/2001 and 264793/2001 are publicly known as examples of the cross-sectional structure of the above-described peripheral portion.

The peripheral portion has two important roles, one of which is to fix upper and lower substrates with a sealing material, and the other of which is to lead lines. The former has the problem that its strength needs to be increased, and it is particularly important to increase the adhesion force between the sealing material and a layer to which the sealing material adheres. The latter has the problem that reliability needs to be ensured in a lead portion of each line, and it is particularly important to prevent the lead portion from coming into direct contact with a sealing portion. Therefore, the invention aims to provide a liquid crystal display device in which the two problems can be compatibly solved.

In addition, a liquid crystal display device in which an organic insulating film is constructed in a layer overlying lines and electrodes are constructed on the organic insulating film is disclosed in, for example, Japanese Patent Laid-Open No. 230378/1997. However, the present inventor has found out a new problem that in the case where an organic insulating film and a sealing material are stuck to each other, a layer to which to stick the sealing material is stuck is the organic insulating film itself, and in this case, the adhesion force therebetween lowers. Therefore, the invention also aims to provide a liquid crystal display device in which the above-described two problems can be compatibly solved even if the liquid crystal display device has an organic film layer formed in contact with an alignment layer in each pixel.

Further problems to be solved by and further objects to be achieved by the present application will become apparent in the present specification.

SUMMARY OF THE INVENTION

Representative examples for solving the problems according to the invention will be described below.

(1)
A liquid crystal display device includes a liquid crystal layer and a color filter layer interposed between a first substrate and a second substrate, a plurality of gate lines formed on the first substrate, a plurality of drain lines disposed on the first substrate in matrix form to intersect the plurality of gate lines, thin film transistors formed on the first substrate and respectively disposed to correspond to intersections of the gate lines and the drain lines, a sealing material which causes the first substrate and the second substrate to adhere to each other along their peripheral portions, and alignment films formed on at least surfaces of the respective first and second substrates, which surfaces are closest to the liquid crystal layer. The first substrate has an organic film formed between each of the thin film transistors and the alignment film formed on the first substrate, and the organic film is removed in an area of the sealing material. The sealing material is adhered to an inorganic film on the first substrate and to an organic film on the second substrate.

(2)
In a liquid crystal display device as in (1), a protective film of each of the thin film transistors is a stacked film made of an inorganic film formed of SiN and a photosensitive organic material, and the stacked film made of the inorganic film and the photosensitive organic film has openings worked through one exposure cycle during formation of contact holes.

(3)
An active matrix type liquid crystal display device includes a liquid crystal layer and a color filter layer interposed between a first substrate and a second substrate, a plurality of gate lines formed on the first substrate, a plurality of drain lines disposed on the first substrate in matrix form to intersect the plurality of gate lines, thin film transistors formed on the first substrate and respectively disposed to correspond to intersections of the gate lines and the drain lines, and a sealing material which causes the first substrate and the second substrate to adhere to each other along their peripheral portions. Each of the drain lines is connected to a metal material formed in the same process as the gate lines on a display-area side of the sealing material, is led under the sealing material as a metal material layer formed in the same process as the gate lines, and in an external-connection-terminal-side area outside the sealing material, is led from the metal material layer formed in the same process as the gate lines and is connected to an external connection terminal via a metal material layer formed in the same process as the drain lines.

(4)
In a liquid crystal display device as in (3), an organic film formed as a protective film for the thin film transistor has an opening in an area under the sealing material in which each of the drain lines is led as the metal material layer formed in the same process as the gate lines, and the sealing material in the area is adhered to an inorganic insulating film.

(5)
In a liquid crystal display device as in (3) or (4), a protective film for the thin film transistor is a stacked film made of an inorganic film formed of SiN and a photosensitive organic material, and the stacked film made of the inorganic film and the photosensitive organic film has openings worked through one exposure cycle during formation of contact holes.

(6)

A liquid crystal display device includes a liquid crystal layer and a color filter layer interposed between a first substrate and a second substrate, a plurality of gate lines formed on the first substrate, a plurality of drain lines disposed on the first substrate in matrix form to intersect the plurality of gate lines, thin film transistors formed on the first substrate and respectively disposed to correspond to intersections of the gate lines and the drain lines, alignment films formed on at least surfaces of the respective first and second substrates, which surfaces are closest to the liquid crystal layer, polarizers respectively disposed on surfaces of the first substrate and the second substrate on sides opposite to the liquid crystal layer, and a sealing material which causes the first substrate and the second substrate to adhere to each other along their peripheral portions. Each pixel in a pixel area defined as an aggregation of pixels has a pixel electrode and a common electrode on the first substrate and the liquid crystal layer is driven by an electric field being generated between the pixel electrode and the common electrode and having a component parallel to the first substrate. A transparent electrode wider than at least each of the pixels is formed in an area between the pixel area and the sealing material on the first substrate. The respective alignment films have areas formed on the first substrate and the second substrate and positioned in an area in which the transparent electrode is formed, and the respective polarizers have areas positioned and provided in the area in which the alignment films are formed. The polarizers, the liquid crystal layer and the alignment films are arranged to realize a normally black mode.

(7)

A liquid crystal display device includes a liquid crystal layer and a color filter layer interposed between a first substrate and a second substrate, a plurality of gate lines formed on the first substrate, a plurality of drain lines disposed on the first substrate in matrix form to intersect the plurality of gate lines, thin film transistors formed on the first substrate and respectively disposed to correspond to intersections of the gate lines and the drain lines, a sealing material which causes the first substrate and the second substrate to adhere to each other along their peripheral portions, and column-shaped spacers which determine a gap between the first substrate and the second substrate. Each of the column-shaped spacers has at least two areas having different thicknesses in an area between a pixel area defined as an aggregation of pixels and the sealing material. At least one of the at least two areas has a height which determines the gap between the first substrate and the second substrate, while another of the at least two areas is formed to be thinner than the at least one. The column-shaped spacers are made of a material which exhibits a light shielding effect.

(8)

A liquid crystal display device includes a liquid crystal layer and a color filter layer interposed between a first substrate and a second substrate, a plurality of gate lines formed on the first substrate, a plurality of drain lines disposed on the first substrate in matrix form to intersect the plurality of gate lines, thin film transistors formed on the first substrate and respectively disposed to correspond to intersections of the gate lines and the drain lines, and a sealing material which causes the first substrate and the second substrate to adhere to each other along their peripheral portions. The color filter layer is formed on the first substrate and has a line superposition area in which a material of each of the drain lines and a material of each of the gate lines are formed with the end portions of the respective materials superposed on each other with an interlayer insulting film interposed therebetween in a portion between a pixel area defined as an aggregation of pixels and a terminal area, and at least one layer of the color filter layer is formed in the line superposition area.

(9)

A liquid crystal display device includes a liquid crystal layer and a color filter layer interposed between a first substrate and a second substrate, a plurality of gate lines formed on the first substrate, a plurality of drain lines disposed on the first substrate in matrix form to intersect the plurality of gate lines, thin film transistors formed on the first substrate and respectively disposed to correspond to intersections of the gate lines and the drain lines, and a sealing material which causes the first substrate and the second substrate to adhere to each other along their peripheral portions. The sealing material is adhered to an organic material of the first substrate and to an inorganic material of the second substrate.

(10)

A liquid crystal display device as in (9), the inorganic material of the second substrate to which the sealing material is adhered is the second substrate itself.

Further aspects and features of the invention will become apparent from the following description of embodiments of the invention.

DESCRIPTION OF THE PREFERRED EMBODIMENTS

Preferred embodiments of the invention will be described below with reference to representative structures thereof.

(Embodiment 1)

Figure 1:
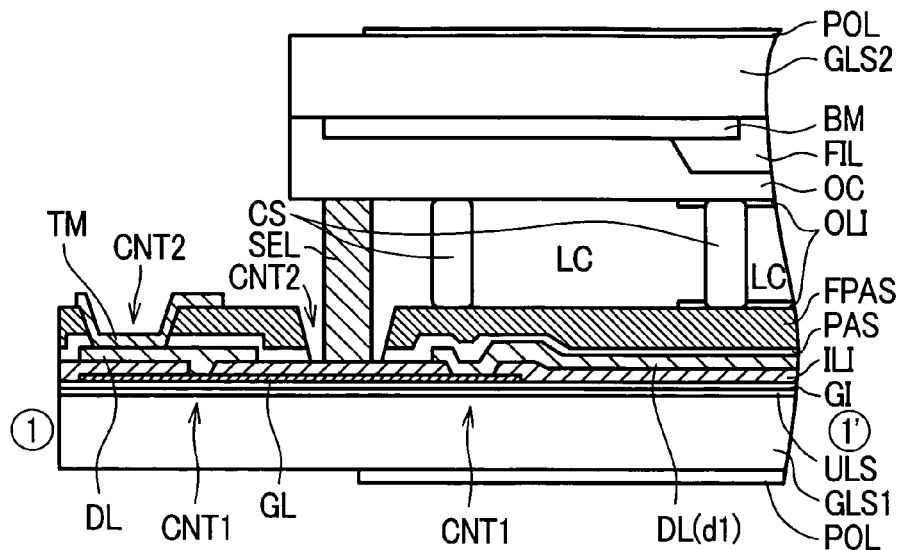
FIG. 1 is a cross-sectional view of a peripheral portion of a TFT liquid crystal display device according to Embodiment 1 of the invention.
Figure 2:
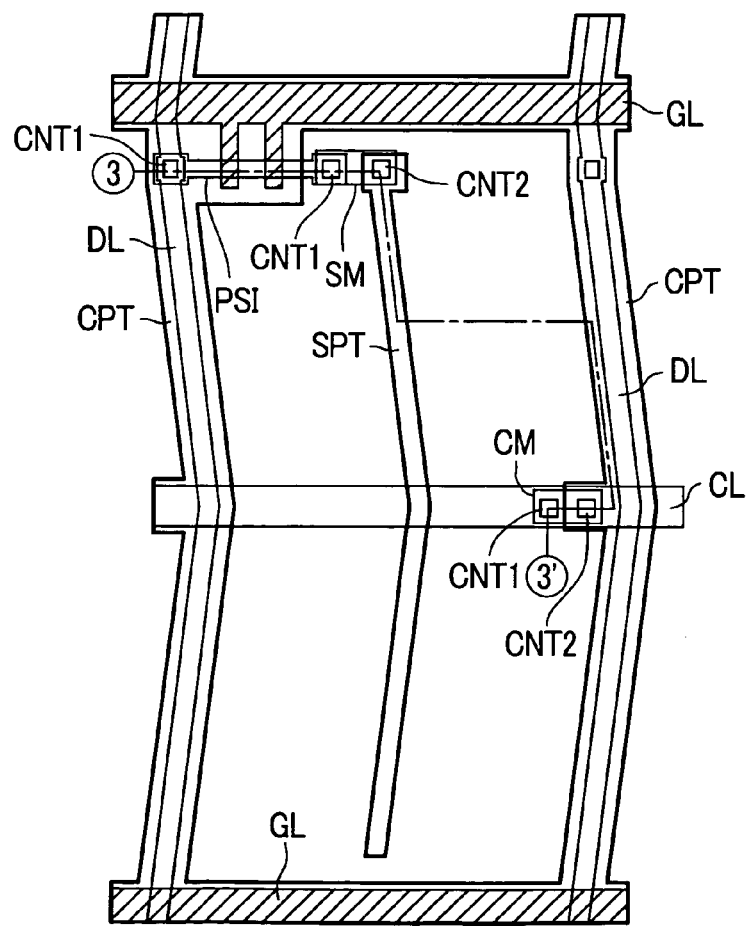
FIG. 2 is a plan view of a pixel of the TFT liquid crystal display device according to Embodiment 1 of the invention.
Figure 3:
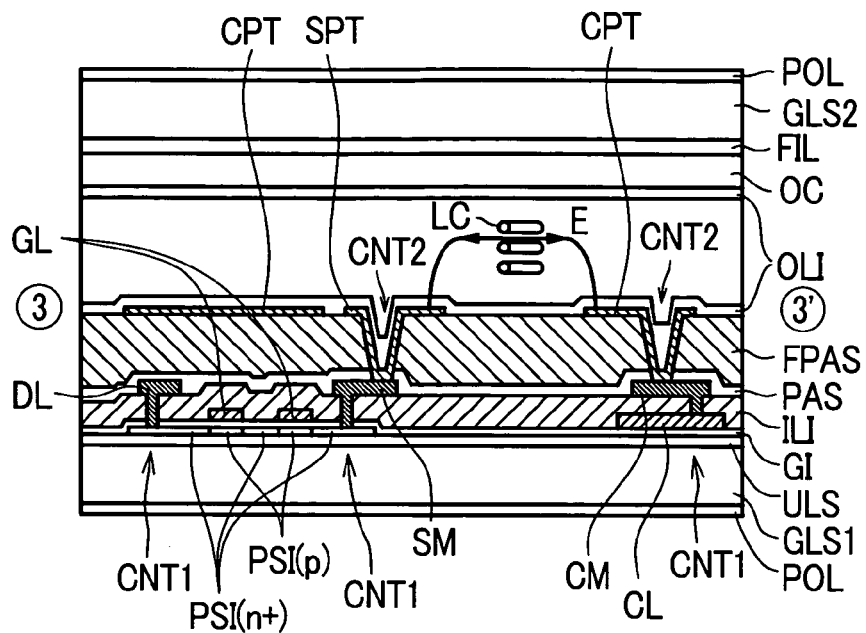
FIG. 3 is a cross-sectional view of the essential portion of the pixel of the TFT liquid crystal display device according to Embodiment 1 of the invention.
Figure 4:
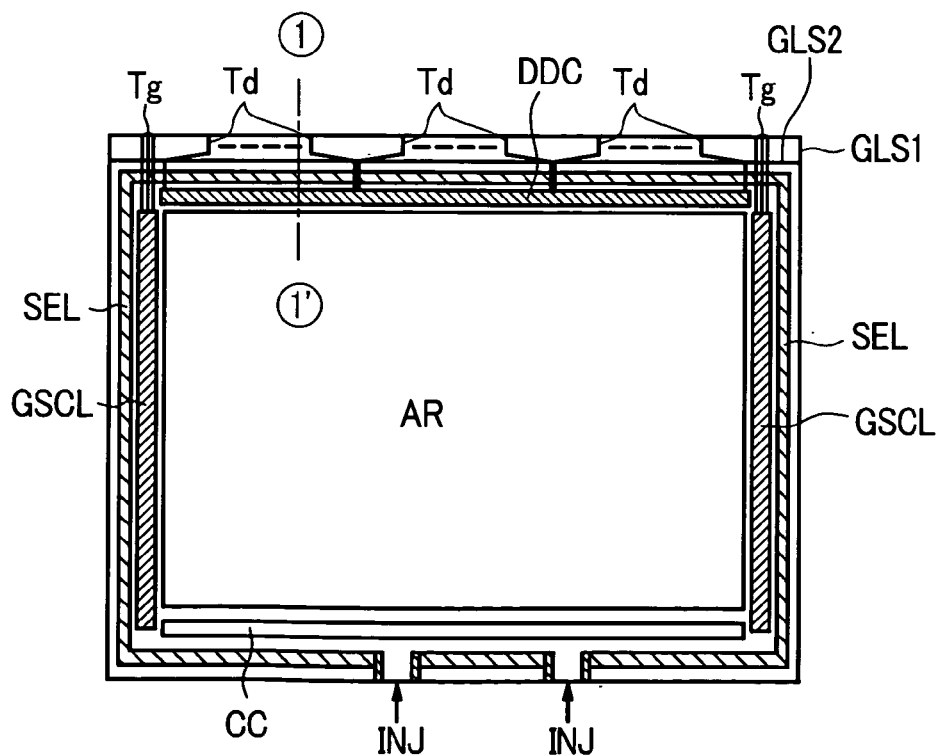
FIG. 4 is a general plan view of the whole of a liquid crystal display panel.
Figure 5:
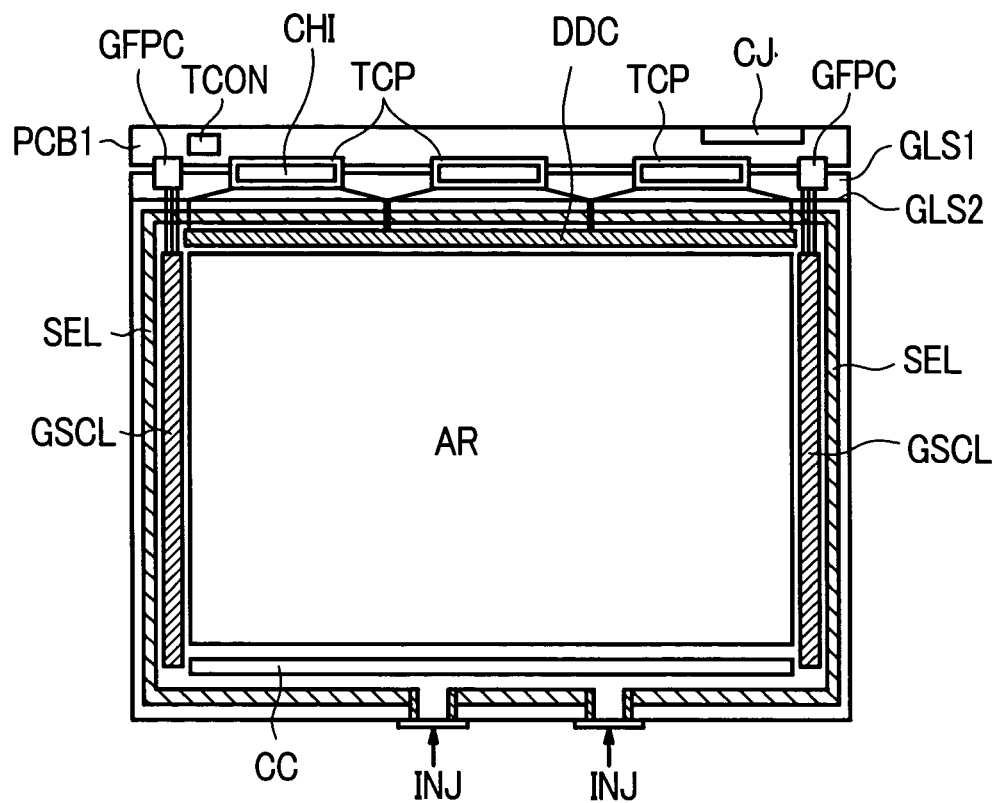
FIG. 5 is a general plan view of the liquid crystal display panel to which a PCB board and TAB chips are connected.

FIG. 1 is a cross-sectional view of a peripheral portion of a liquid crystal display device according to one embodiment of the invention in which a video signal line (drain line) is disposed, FIG. 2 is a plan view of a pixel portion of the liquid crystal display device, FIG. 3 is a cross-sectional view of the pixel portion of the liquid crystal display device, FIG. 4 is a plan construction view of a liquid crystal panel, and FIG. 5 is a view showing the state in which the liquid crystal panel shown in FIG. 4 is connected to an external circuit. FIG. 1 is a cross-sectional view taken along the dot-dashed cutting line 1–1' shown in the plan construction view of FIG. 4, and also is a cross-sectional view of the peripheral portion of the liquid crystal panel in which a line terminal Td for one end of one video signal (drain) line is disposed.

First of all, the construction of the pixel portion will be described with reference to FIG. 2. An area surrounded by two video signal lines DL and two gate lines GL constitutes a pixel. A common electrode CPT is constructed in matrix form to cover the drain signal lines DL and the gate signal lines GL. The common electrode CPT may be made of a metal material. The common electrode CPT may also be formed of a transparent electrode made of, for example, ITO, IZO or ITZO so that a substantial optically transmissive area of the pixel portion can be improved. In Embodiment 1, the common electrode CPT is made of ITO by way of example. A polysilicon layer PSI is connected to a video signal line DL by a contact hole CNT1, and is connected to a source electrode SM by the contact hole CNT1 beyond a gate electrode extended from a gate line GL. The source electrode SM is connected to a pixel electrode SPT by a contact hole CNT2. The pixel electrode SPT may be made of a metal material. The pixel electrode SPT may also be formed of a transparent electrode made of, for example, ITO, IZO or ITZO so that the substantial optically transmissive area of the pixel portion can be improved. In Embodiment 1, the pixel electrode SPT is made of ITO by way of example. Namely, in Embodiment 1, the common electrode CPT and the pixel electrode SPT are formed of ITO in the same layer. The pixel portion has a common line CL parallel to the gate line GL, and the common line CL is connected to a common metal electrode CM by a contact hole CNT1. The common line CL is further connected to the common electrode CPT by a contact hole CNT2. In this manner, a common potential is supplied from the common line CL to the common electrode CPT.

FIG. 3 shows a cross-sectional construction of the pixel portion taken along line 3–3' of FIG. 2. In FIG. 3, reference numerals 3 and 3' are circled for the convenience of clarity in illustration. However, similar circles such as those used in FIG. 3 for the purpose of representing cross-sectional portions are omitted in the description given herein.

The portion taken along line 3–3' is a cross section which passes through the video signal line DL, the polysilicon layer PSI of a thin film transistor TFT, the source electrode SM, the pixel electrode SPT, a main optically transmissive part, the common electrode CPT, the common metal electrode CM and the common line CL. The left-hand side of FIG. 3 corresponds to a cross section of the thin film transistor TFT. The video signal line DL is connected through the contact hole CNT1 to a PSI($n^+$) layer which serves as one electrode of the thin film transistor TFT, and the source electrode SM is connected through the contact hole CNT1 to a PSI($n^+$) layer which serves as the other electrode of the thin film transistor TFT. The thin film transistor TFT is a so-called MOS type TFT in which the gate electrodes GL are formed on a gate insulating film GI by a gate interconnection layer, and the structure shown on the left-hand side of FIG. 3 is a structure called a top gate type or a planar type. However, the structure is not particularly limiting matter.

A base insulating film ULS which is made of a SiN film of thickness 50 nm and a $SiO_2$ film of thickness 120 nm is formed on a non-alkali TFT glass substrate GLS1 having a strain point of about 670° C.

The polysilicon layer PSI lies over the base insulating film ULS, and a gate insulating film GI made of $SiO_2$ overlies the polysilicon layer PSI. The gate electrode overlies the gate insulating film GI, and an interlayer insulating film ILI is formed to cover the gate electrode. The drain line DL made of metal is formed on the interlayer insulating film ILI, and is made of, for example, a three-layer metal film of Ti/Al/Ti. The drain line DL is connected to the high-concentration n-type layer PSI($n^+$) doped with phosphorus as an impurity in the low-temperature polysilicon PSI, through the first contact hole CNT1 formed in the gate insulating film GI and the interlayer insulating film ILI. The high-concentration n-type layer PSI($n^+$) has high conductivity and works as an interconnection part in pseudo form. On the other hand, the polysilicon layer PSI underlying the gate line GL made of a metal film such as Mo or MoW is formed as a p-type layer PSI(p) doped with boron as an impurity, and works as a so-called semiconductor layer and shows a switching operation in which the polysilicon layer PSI is brought to an electrically conductive state when the gate line GL goes to an ON potential, or to an electrically non-conductive state when the gate line GL goes to an OFF potential.

When an ON voltage is applied to the gate line GL, the potential at the interface between the gate insulating film GI underlying the gate line GL and the p-type layer PSI(p) doped with boron as an impurity is inverted to form a channel layer, and an ON current flows in the resulting n-type TFT, so that a current is allowed to flow into the source electrode SM, thereby charging a liquid crystal capacitance.

The interlayer insulating film ILI made of $SiO_2$ is formed to cover the gate line GL. The above-described constituent elements including the drain line DL are covered with a protective insulating film PAS made of SiN of thickness 200 nm and an organic protective film FPAS of thickness 2 $\mu$m which essentially contains an acrylic resin. The common electrode CPT and the pixel electrode SPT each made of indium-tin oxide (ITO) are formed on the organic protective film FPAS. The pixel electrode SPT is connected to the source electrode SM by the contact hole CNT2 provided in the protective film FPAS and the protective film PAS.

The common line CL is constructed in the same layer as the gate line GL. The common line CL is connected to the common metal electrode CM by the contact hole CNT1 formed in the interlayer insulating film ILI. The common metal electrode CM and the common electrode CPT are connected to each other by the contact hole CNT2 provided in the organic protective film PAS and the organic protective film FPAS.

The construction in which the pixel electrode SPT and the PSI(n$^+$) layer are connected to each other by the source electrode SM and the common line CL and the common electrode CPT are connected to each other by the common metal electrode CM has the advantage that contact holes can be made smaller than those in the case where the pixel electrode SPT and the PSI(n$^+$) layer are directly connected to each other and the common line CL and the common electrode CPT are directly connected to each other. In addition, since the depth of contact holes to be worked in one process can be decreased, workability is improved and imperfect contact due to residues is restrained, whereby an improvement in yield is realized.

An electric field having a component parallel to the substrate GLS1, i.e., a so-called lateral electric field E, is generated between the pixel electrode SPT and the common electrode CPT, thereby driving liquid crystal molecules in a liquid crystal layer LC.

A color filter CF is formed on a substrate GLS2 which is opposed to the substrate GLS1 to seal the liquid crystal LC. Color filters FIL each made of an organic film material in which a pigment for providing color display is dispersed are formed on the substrate GLS2, and each of the color filters FIL serves as a color filter which represents transmitted light of blue (B), red (R) or green (G) according to a color assigned to each pixel. An overcoat film OC made of an organic material is formed on the inside surface of the color filter CF. The overcoat film OC has the effect of improving the flatness of the color filter CF. Alignment films OLI are respectively formed on the surfaces of the substrates GLS2 and GLS1 that are in contact with the liquid crystal LC, and are subjected to alignment treatment, when necessary to control the initial alignment direction of the liquid crystal LC. Polarizers POL are respectively stuck to the outside surfaces of the substrates GLS2 and GLS1. These polarizers POL are arranged in a so-called crossed-Nicols state in which their polarizing axes are perpendicular to each other between the glass substrates GLS2 and GLS1. The liquid crystal display device is constructed to operate in a normally black mode in which black display is provided with no electric fields applied to the liquid crystal LC.

Each area defined between the pixel electrode SPT and the common electrode CPT is a main optically transmissive area. In the IPS type of liquid crystal display device, the molecules of the liquid crystal LC are rotated by lateral electric fields E applied between the pixel electrode SPT and the common electrode CPT, to vary the degree of polarization of the polarizers POL arranged in the crossed-Nicols state, thereby varying the transmissivity of the liquid crystal LC. Consequently, when no electric fields are applied in the lateral direction, the transmissivity does not vary even if the pixel electrode SPT or the common electrode CPT is a transparent electrode such as an ITO electrode. In Embodiment 1, a positive liquid crystal material is used as the liquid crystal molecules LC and a lateral electric field component is applied to a portion 1.5 $\mu$m inward from each end of each of the pixel transparent electrode SPT and the common transparent electrode CPT, and therefore, the portion contributes to optical transmissivity.

The dielectric constant of the organic protective film FPAS is as low as about 3 which is approximately half of about 7 of the inorganic protective film PAS formed of SiN. In addition, the organic protective film FPAS having a thickness of 2 $\mu$m or more which is about ten times the thickness (200 nm) of the organic protective film PAS made of SiN can be easily realized because the organic protective film FPAS can be formed by an application method compared to the organic protective film PAS formed of SiN by a vapor growth method in a vacuum. Accordingly, even if the transparent electrodes SPT and CPT disposed on the organic protective film FPAS are disposed on the drain line DL, the parasitic capacitance between the drain line DL and the transparent electrodes SPT and CPT can be made extremely small, so that the plane layout of the pixel portion can be optimized to improve the aperture ratio thereof and a bright liquid crystal display device can be provided.

In a display device in which polysilicon is used as its semiconductor layer, it is desirable that a SiN film having the effect of replacing defects in a polysilicon layer PSI be provided in any of layers overlying the polysilicon layer PSI. In Embodiment 1, this construction is realized by forming the protective insulating film as a SiN film. SiN has the characteristic of trapping hydrogen in the form of SiN:H. This is because dangling bonds are stabilized by being terminated by H atoms. Accordingly, defects in the polysilicon layer PSI can be replaced to stabilize the characteristics of the polysilicon layer PSI, thereby preventing variations in threshold voltage.

In the case where two kinds of protective films, i.e., the organic protective film PAS made of SiN and the organic protective film FPAS made of an acrylic resin, are respectively worked by separate photo-processes, the number of manufacturing processes increases and the manufacturing cost of the liquid crystal display device increases. In Embodiment 1, a photosensitive acrylic resin is used for the organic protective film FPAS, and after this photosensitive acrylic resin has been developed, the organic protective film FPAS itself is used as a mask to work the organic protective film PAS. Accordingly, the opening ends of the respective second contact holes CNT2 have approximately the same pattern. Owing to the adoption of this construction, it is possible to provide a bright liquid crystal display device in spite of a simple manufacturing process.

A plane structure of the external appearance of the liquid crystal panel will be described below. FIG. 4 is a plan view showing the essential portions of the periphery of a matrix AR of the liquid crystal display panel including the lower and upper glass substrates GLS1 and GLS2. In the manufacture of this type of panel, if small-sized panels are to be manufactured, a plurality of devices are worked on one glass substrate at the same time and the glass substrate is divided into individual devices for the purpose of increasing throughput. If large-sized panels are to be manufactured, even in the case of any kind of article, a standard-sized glass substrate is worked and is then reduced to a size suited to the kind of article for the purpose of sharing manufacturing facilities among various kinds of articles. In either case, after a series of processes have been completed, the glass is cut.

FIG. 4 shows an example of the latter case, and represents the lower and upper glass substrates GLS1 and GLS2 which are already cut. In either case, when the liquid crystal display panel is completed, the size of the upper substrate GLS2 is smaller than that of the substrate GLS1 so that the upper substrate GLS2 is set back from the substrate GLS1 to expose external connecting terminals Tg and Td in a portion where the external connecting terminals Tg and Td are present (the top side of FIG. 4). Each of the terminals Tg includes connecting terminals which are associated with power source data and timing data to be supplied to the corresponding one of scanning circuits GSCL made of low-temperature polysilicon TFTs which are respectively disposed on the left and right sides of the display part AR on the TFT glass substrate GLS1 which will be described later. Each of the terminals Td includes terminals for supplying video data or power source data to a drain division circuit DDC made of low-temperature polysilicon TFTs on the TFT glass substrate GLS1 in the top portion of the display part AR. Each of the terminals Td includes a plurality of lead line portions which are grouped for each individual tape carrier package TCP (FIG. 5) on which an integrated circuit chip CHI is mounted. The lead lines of each of the terminals Td extend from the matrix portion AR to an external connecting terminal portion through the drain division circuit DDC, and are arranged so that the inclinations of the lead lines gradually become larger toward each of the outermost lead lines. This arrangement is intended to adjust the drain signal terminals Td of the display panel to the arrangement pitch of the tape carrier packages TCP and the connecting terminal pitch of each of the tape carrier packages TCP.

A sealing pattern SEL is formed to seal the liquid crystal LC between the transparent glass substrates GLS1 and GLS2 along the edges thereof except liquid crystal injecting ports INJ. The sealing material of the sealing pattern SEL is made of, for example, an epoxy resin.

The layers of the alignment films OLI shown in cross-sectional structure in FIG. 3 are formed on the inside of the sealing pattern SEL. The liquid crystal LC is sealed in the area defined by the sealing pattern SEL between the lower alignment film OLI and the upper alignment film OLI which serve to set the orientation of the liquid crystal molecules.

This liquid crystal display device is assembled by stacking various layers on each of the lower transparent glass substrate GLS1 and the upper transparent glass substrate GLS2, forming the sealing pattern SEL on the substrate GLS2, superposing the lower transparent glass substrate GLS1 and the upper transparent glass substrate GLS2 on each other, injecting the liquid crystal LC through the injecting ports INJ provided as openings in the sealing material SEL, sealing the injecting ports INJ with an epoxy resin or the like, and cutting the lower and upper glass substrates SUB1 and SUB2. As a matter of course, the injection of the liquid crystal LC may be performed by a suction method or a dropping method.

FIG. 5 is a top plan view showing the state of connection between the tape carrier packages TCP which are disposed on the display panel shown in FIG. 4 and on which video signal driver ICs are respectively mounted and the drain division circuit DDC formed of low-temperature polysilicon TFTs on the TFT substrate GLS1 and the state of connection between an external circuit and the scanning circuits GSCL formed of low-temperature polysilicon TFTs on the TFT substrate GLS1.

Symbol TCP denotes tape carrier packages on which the respective driver IC chips are mounted by tape automated bonding (TAB), and symbol PCB1 denotes a driver circuit board on which the TCPs, a control IC TCON, a power source amplifier, resistors, capacitors and the like are mounted. Symbol CJ denotes a connector connecting part to introduce signals from a personal computer or electric power.

As described above, the peripheral portion of the liquid crystal display device is an area on the TFT glass substrate GLS1 in which the connecting terminals Tg or Td are formed, and is also an area in which the sealing material SEL for connecting the TFT glass substrate GLS1 and the CF glass substrate GLS2 is formed.

The peripheral portion of the liquid crystal display device, i.e., an area outside the effective display area thereof, will be described below with reference to FIG. 1 which shows an example of a cross-sectional structure taken along cutting line 1–1' of FIG. 4.

The substrates GLS1 and GLS2 are fitted to each other by the sealing material SEL, and the liquid crystal is interposed between the substrates GLS1 and GLS2. The sealing material SEL serves the role of an adhesive for the lower and upper glass substrates GLS1 and GLS2, and is formed by printing or applying an organic material and curing the organic material by ultraviolet rays or heat.

A connecting terminal electrode TM to be finally connected to a tape carrier package TCP or a flexible printed circuit board FPC which is an external circuit is formed in the area of the substrate GLS1 that projects outward from the substrate GLS2. The connecting terminal electrode TM is formed of ITO used for, for example, the pixel electrode SPT in the cross-sectional structure of the pixel area shown in FIG. 3. Transparent conductors such as ITO are oxides which are higher in oxidation stability than almost all metal materials, and are materials capable of improving the corrosion resistance of terminals exposed to moisture, such as the connecting terminal electrode TM. The right-hand area of FIG. 1 is an area which extends toward the pixel area. Each of the line terminals Td shown in FIG. 4 includes lines each having a current passage which is made of, as generally shown in FIG. 1, the connecting terminal electrode TM, the contact hole CNT2 opened in the protective film PAS and the organic protective film FPAS, a metal line (denoted by DL in FIG. 1) formed in the same process and of the same material as the drain line DL shown in FIG. 3, the first contact hole CNT1 opened in the interlayer insulating film ILI, a metal material (denoted by GL in FIG. 1) formed in the same process and of the same material as the gate line GL shown in FIG. 3, the contact hole CNT1, and the drain line DL.

The gap between the substrates GLS1 and GLS2, i.e., a liquid crystal gap, can be defined by spacers CS. The spacers CS can be formed by working an organic film on the either of the substrates GLS1 or GLS2 through a series of processes: application, photo-processing, development and heating. The spacers CS are worked in a shape such as cylindrical, trapezoidal or rectangular, and are arranged in the pixel portions in units of one per several pixels at locations which can reduce the influence of the spacers CS on optical transmissivity as well as the influence of the spacers CS on the alignment state of the liquid crystal molecules LC due to rubbing treatment of the alignment films ORI. The spacers CS are also arranged to hold the liquid crystal gap in the peripheral portion.

The above-described peripheral portion is required to have four major roles: (1) holding a liquid crystal gap; (2) causing upper and lower substrates to adhere to each other; (3) preventing corrosion of lines in a terminal area susceptible to the influence of corrosion due to moisture; and (4) preventing uncontrollable light leak.

Regarding (1), it is desirable that fibers or the spacers CS be provided in the sealing material SEL or the spacers CS be provided in the vicinity of the sealing material SEL. FIG. 1 shows a construction in which the spacers CS are provided in the vicinity of the sealing material SEL. As a matter of course, additional fibers or spacers may also be provided in the sealing material SEL. However, in a structure in which there is a step between the pixel area and the portion of the sealing material SEL as shown in FIG. 1, it is desirable to use either or both of a construction in which the spacers CS are provided in the area of the organic protective film FPAS that is formed in the vicinity of the sealing material SEL and a construction in which fibers thicker than the spacers CS are provided within the sealing material SEL.

Regarding (4), in Embodiment 1, as shown in FIG. 1, a black matrix BM made of an organic material into which a metal or a black pigment is incorporated is disposed on the inside surface of the substrate GLS2 so that a light shielding effect is obtained to prevent light leak from the peripheral portion.

Regarding (2), it is more desirable that the adhesion strength between the upper and lower substrates be made greater. This is because the reliability of the liquid crystal display device is improved. The upper and lower substrates are adhered to each other by the sealing material SEL, and the adhesion strength strongly depends on the surface states of the mutually opposed substrates, for example, the degree of contamination, the presence or absence of moisture, or minute unevenness of the surfaces. In Embodiment 1, the overcoat film OC is formed on the CF glass substrate GLS2, thereby leveling the steps of the color filter CF. This leveling can prevent imperfect formation of the sealing material SEL or formation of voids therein due to the presence of steps, whereby the adhesion strength is improved. The organic protective film FPAS is formed in the pixel area on the substrate GLS1 as shown in FIG. 3. A positive photosensitive organic material is used for the organic protective film FPAS. The organic protective film FPAS is such an organic material and incorporates solvent components during deposition, and therefore, has the problem that the solvent components ate difficult to remove completely even by heating after the formation of the organic protective film FPAS, so that the adhesiveness of the organic protective film FPAS to the sealing material SEL is low. In contrast, the protective film PAS made of SiN which is a non-organic material and the interlayer insulating film ILI made of $SiO_2$ have extremely strong adhesion strength. Accordingly, it is desirable that the sealing material SEL be adhered to a surface of the organic protective film PAS or the interlayer insulating film ILI. In addition, by incorporating a silane coupling material into the sealing material SEL, it is possible to improve the adhesion strength between the sealing material SEL and the organic protective film PAS or the interlayer insulating film ILI which contains Si to a further extent. This is because intermolecular forces can be increased.

In Embodiment 1, the following structure is introduced to improve the adhesion strength of the sealing material SEL. An opening CNT2 is formed in a stacked film made of the organic protective film FPAS and the organic protective film PAS on the substrate GLS1. The method of forming the opening CNT2 is the same as the method of forming the second contact holes CNT2 shown in FIG. 3. The width of each of the second contact holes CNT2 is made larger than at least a width which can stably retain the adhesion strength between the upper and lower glass substrates GLS2 and GLS1. In Embodiment 1, the width of the opening CNT2 is made larger than the width of the sealing material SEL. The sealing material SEL is in contact with the interlayer insulating film ILI, and is extremely high in adhesion strength. In addition, the surface of the interlayer insulating film ILI in the opening CNT2 is a surface obtained by subjecting the protective film PAS to dry etching with a F-based gas, and the purity of the surface of the interlayer insulating film ILI is high. Further, since an extremely minute form of unevenness is formed on the surface of the interlayer insulating film ILI, the surface is formed as a surface of extremely high adhesion strength due to an increase in its contact area, whereby the adhesion effect of the surface of the interlayer insulating film ILI is increased. Because of such minuteness, it is possible to achieve only the effect of improving adhesion force without producing voids or the like. Accordingly, it is desirable that the difference between the local heights of the minute unevenness be made 50 nm or less.

Regarding the prevention of line corrosion mentioned in (3), Embodiment 1 introduces the following structure which can compatibly realize the prevention of line corrosion and an increase in the adhesion strength. In Embodiment 1, the drain line DL is led to the outside terminal TM by being first connected to the layer of the gate line GL via the first contact hole CNT1 on the pixel-area side of the sealing material SEL, then being passed through at least the area of the sealing material SEL, then being passed through the first contact hole CNT1 into a metal material area formed in the same process and of the same material as the drain line DL, and finally being led via the second contact hole CNT2 to the terminal electrode TM formed of a corrosion-resistant oxide transparent conductor such as ITO. Namely, since the drain line DL is temporarily connected to the line formed in the same process and of the same material as the gate line GL, the top surface of at least the portion of the metal line that underlies the area of the sealing material SEL is protected by the interlayer insulating film ILI so that the corrosion resistance of the metal line is retained. As a matter of course, in terms of an improvement in corrosion resistance, the organic protective film PAS may be formed to extend onto the interlayer insulating film ILI.

The reason why the terminal portion TM is connected to the gate line material via the metal material formed in the same layer as the drain line DL is to obtain a general-purpose structure which enables a material, such as Mo or MoW, which has a small selection ratio with respect to dry etching with a F-based gas to be applied to, for example, the material of the gate electrode GL. In the case of such a material having a small selection ratio, if the gate line GL is exposed to an etching gas when the second contact hole CNT2 is opened, the gate electrode GL may be removed by etching, so that there is a risk that the gate electrode GL may be lost in the area of the sealing material SEL. For this reason, to solve such risk, the terminal portion TM is temporarily connected to the same material as the drain line DL. As a matter of course, in the case of a material having a high resistance to dry etching, the terminal portion TM and the layer of the gate line GL may also be directly connected to each other. Incidentally, in the case where the line material of the drain line DL is formed to be thick, the organic protective film FPAS is also provided around the terminal portion TM in order to sufficiently protect the drain line DL which is in contact with the terminal portion TM in an area outside the sealing material SEL. In Embodiment 1, the same line material as the drain line DL is formed to be as thick as 500 nm or more in terms of a delay decrease due to a lowering of the resistance of the drain line DL, the drain line DL is covered with the protective film PAS as well as the organic protective film FPAS provided on the organic protective film PAS.

The first contact hole CNT1 and the second contact hole CNT2 formed under the area in which the terminal electrode TM is deposited are arranged so that their respective openings do not overlap each other in plan view. The reason for this is to avoid an increase in step size due to the overlap of the contact hole CNT1 and CNT2 and realize a decrease in the connection resistance between the terminal electrode TM and the semiconductor chip TCP by means of a reduction in step size, as well as to prevent corrosion of the metal material layer formed in the same layer as the drain line DL underlying the terminal electrode TM by ensuring a sufficiently large deposition shape.

According to the above-described structure given to the sealing material SEL and the area of the terminal electrode TM in the peripheral portion, it is possible to provide a liquid crystal display device in which the adhesion strength of the sealing material SEL is high and there is no risk of corrosion of terminal lines.

A manufacturing process for an NMOS type thin film transistor TFT of the type shown in FIG. 3 and a peripheral portion of the type shown in FIG. 1 will be described below with reference to FIGS. 6A to 11B. In each of the processes shown in FIGS. 6A to 11B, Part A refers to a step of forming the peripheral portion, while Part B refers to a step of forming the pixel portion.

After a non-alkali TFT glass substrate GLS1 of thickness 0.5 mm, of size 730 mm×920 mm as well as of strain point about 670° C. has been cleaned, a SiN film of thickness 50 nm is formed on the glass substrate GLS1 by a plasma CVD method using a mixed gas of $SiH_4$, $NH_3$ and $N_2$. Then, a $SiO_2$ film of thickness 120 nm is stacked on the SiN film by a plasma CVD method using a mixed gas of tetraethoxysilane and $O_2$, whereby a base insulating film ULS is formed in a stacked manner. The base insulating film ULS is formed for the purpose of preventing diffusion of Na from the glass substrate GLS1 into a polycrystalline silicon film. The forming temperature of the SiN film and the $SiO_2$ film is 400° C. Incidentally, in the present specification, polysilicon is used for the semiconductor layer as a representative example, but macrocrystalline silicon, continuous grain silicon (CGS) or amorphous silicon may be also used. The glass substrate GLS1 may also have a different thickness and size.

Then, an approximately intrinsic amorphous silicon hydride film of thickness 50 nm is formed on the base insulating film ULS by a plasma CVD method using a mixed gas of $SiH_4$ and Ar. The deposition temperature is 400° C., and the amount of hydrogen immediately after deposition is about 5 at %. Then, the glass substrate GLS is annealed at 450° C. for about 30 minutes to emit hydrogen from the amorphous silicon hydride film. The amount of hydrogen after annealing is about 1 at %.

Then, the amorphous silicon film is irradiated with an excimer laser beam LASER of wavelength 308 nm at a fluence of 400 mJ/cm² to melt and recrystallize the amorphous silicon film, thereby obtaining an approximately intrinsic polycrystalline silicon film PSI. At this time, the laser beam has a fine linear shape of width 0.3 mm and length 200 mm, and the amorphous silicon film is irradiated with the laser beam while the laser beam is being moved at a 10-$\mu$m pitch on the glass substrate GLS1 in a direction approximately perpendicular to the longitudinal direction of the laser beam. The irradiation is performed in a nitrogen atmosphere.

Figure 6A:
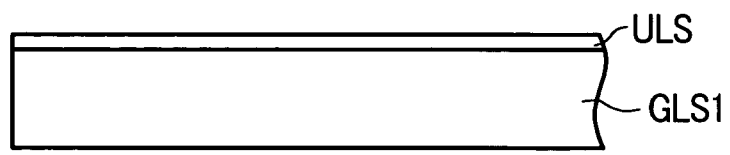
FIGS. 6A and 6B are cross-sectional views aiding in describing a manufacturing method of the TFT liquid crystal display device according to Embodiment 1 of the invention.
Figure 6B:
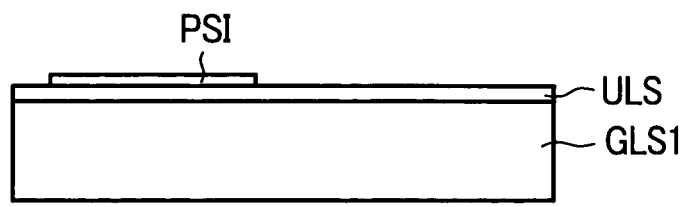

Then, a predetermined resist pattern is formed on the polycrystalline silicon film PSI by a photolithography method, and the polycrystalline silicon film PSI is worked into a predetermined shape by a reactive ion etching method using a mixed gas of $CF_4$ and $O_2$ (FIGS. 6A and 6B).

Then, a $SiO_2$ film of thickness 100 nm is formed by a plasma CVD method using a mixed gas of tetraethoxysilane and oxygen, to obtain the gate insulating film GI. At this time, the mixture ratio of tetraethoxysilane to oxygen is 1:50, and the forming temperature is 400° C. Subsequently, B ions are implanted by ion implantation with an acceleration voltage of 33 KeV and a dosage of 1E12 ($cm^{-2}$), to form a polysilicon film PSI(p) of the channel region of the n-type TFT.

Then, after a metal line material GL, for example, a Mo or MoW film of thickness 200 nm has been formed by a sputtering method, a predetermined resist pattern is formed on the Mo film by an ordinary photolithography method, and the Mo film is worked into a predetermined shape by a wet etching method using a mixed acid, to obtain a gate line GL and a common line CL as well as a gate line GL which constitutes a lead line of a terminal portion TM.

Figure 7A:
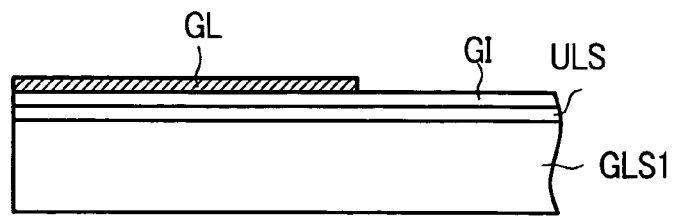
FIGS. 7A and 7B are cross-sectional views aiding in describing the manufacturing method of the TFT liquid crystal display device according to Embodiment 1 of the invention.
Figure 7B:
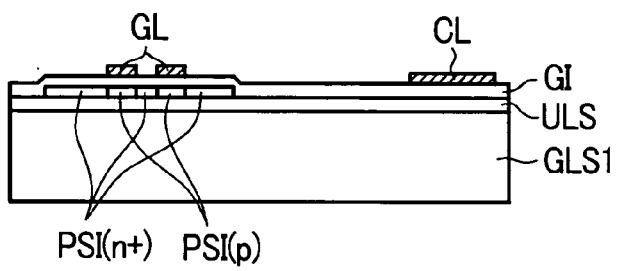

P ions are implanted with the resist pattern used for etching being left, by ion implantation with an acceleration voltage of 60 KeV and a dosage of 1E15 ($cm^{-2}$), to form source and drain regions $PSI(n^+)$ of the n-type TFT (FIGS. 7A and 7B). In the above-described manner, the $n^+$-type low-temperature polysilicon film $PSI(n^+)$ for the source and drain of the n-type TFT and the polysilicon film PSI(p) for the p-type channel region are formed. However, in the following manner, an n-type LDD region which is lower in P ion concentration than the $n^+$-type film may be formed between the p-type film and the $n^+$-type film so that the leak current of the TFT can be reduced (not shown). Specifically, after the resist pattern used for etching has been removed, P ions are again implanted by ion implantation with an acceleration voltage of 65 KeV and a dosage of 2E13 ($cm^{-2}$), to form the LDD region of the n-type TFT. The length of the LDD region is determined by the amount of side etching of the wet-etched Mo film. In Embodiment 1, the length of the LDD region is about 0.8 $\mu$m. This length can be controlled by varying the overetching time of the Mo film.

Then, the implanted impurities are activated by a rapid thermal anneal (RTA) method of irradiating the glass substrate GLS1 with light of an excimer lamp or a metal halide lamp. Since annealing is performed with light containing a large amount of ultraviolet light such as that of the excimer lamp or the metal halide lamp, only the polycrystalline silicon layer PSI can be selectively heated, whereby it is possible to avoid damage due to the heating of the glass substrate GLS1. The activation of the impurities can also be effected by a thermal treatment with a temperature of about 450° C. within the range in which substrate shrinkage, warpage deformation or the like does not become a problem (FIGS. 7A and 7B).

Then, a $SiO_2$ film of thickness 500 nm is formed by a plasma CVD method using a mixed gas of tetraethoxysilane and $O_2$, whereby an interlayer insulating film ILI is obtained. At this time, the mixture ratio of tetraethoxysilane to $O_2$ is 1:5, and the forming temperature is 350° C.

Figure 8A:
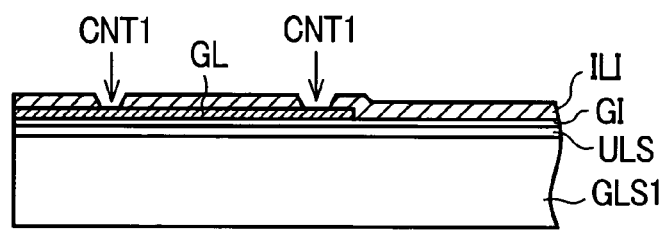
FIGS. 8A and 8B are cross-sectional views aiding in describing the manufacturing method of the TFT liquid crystal display device according to Embodiment 1 of the invention.
Figure 8B:
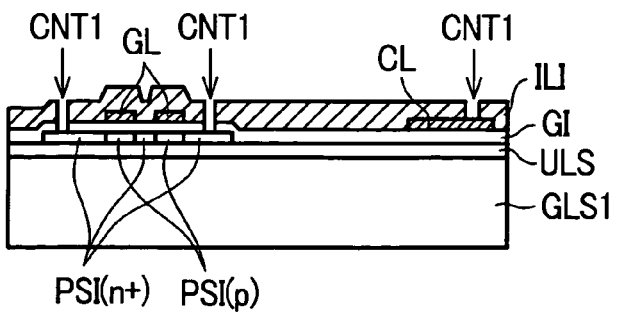

Then, after a predetermined resist pattern has been formed, first contact through-holes CNT1 are formed in the interlayer insulating film ILI by a wet-etching method using a mixed acid. The first contact through-holes CNT1 are opened in the interlayer insulating film ILI or in a stacked film including the interlayer insulating film ILI and the gate insulating film GI. The first contact through-holes CNT1 are opened in only the interlayer insulating film ILI in the case where the metal material layer GL formed in the same process and of the same material as the gate line GL is buried under the interlayer insulating film ILI (FIGS. 8A and 8B).

Figure 9A:
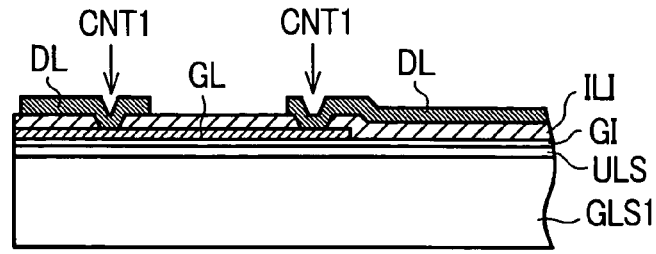
FIGS. 9A and 9B are cross-sectional views aiding in describing the manufacturing method of the TFT liquid crystal display device according to Embodiment 1 of the invention.
Figure 9B:
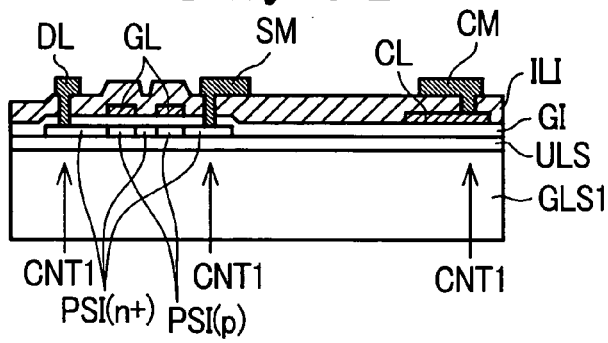

Subsequently, after a Ti film of thickness 50 nm, an Al—Si alloy of thickness 500 nm and a Ti film of thickness 50 nm have been stacked in named order by a sputtering method, a predetermined resist pattern is formed on the stacked films and is collectively etched by a reactive ion etching method using a mixed gas of $BCl_3$ and $Cl_2$, thereby forming a drain line DL, a source electrode SM, a common metal electrode CM and a drain line DL of the terminal portion TM (FIGS. 9A and 9B).

Figure 10A:
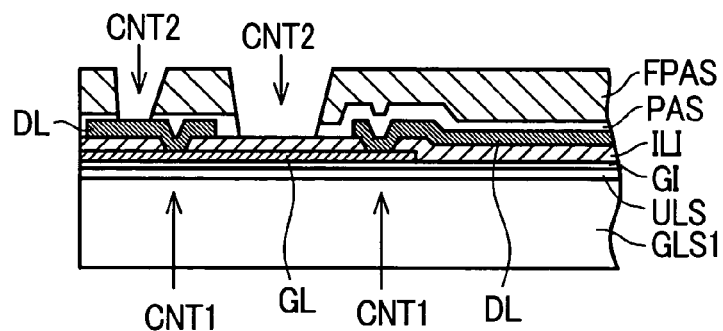
FIGS. 10A and 10B are cross-sectional views aiding in describing the manufacturing method of the TFT liquid crystal display device according to Embodiment 1 of the invention.
Figure 10B:
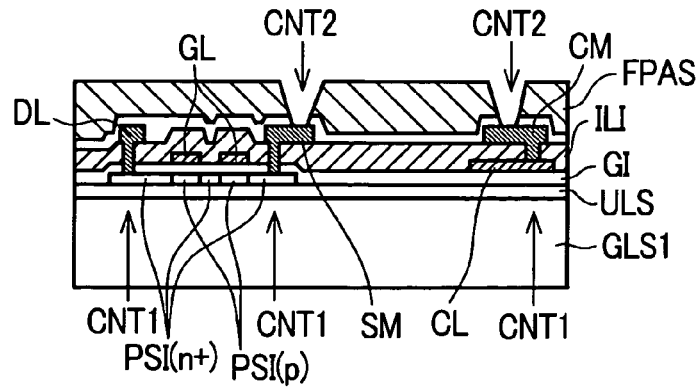

A protective film PAS which is a SiN film of thickness 300 nm is formed by a plasma CVD method using a mixed gas of $SiH_4$, $NH_3$ and $N_2$, and the protective film PAS is coated with an acrylic photosensitive resin with a thickness of about 3.5 μm by spin coating. The acrylic photosensitive resin film is exposed and developed with a predetermined mask to form a through-hole in the acrylic photosensitive resin film. Then, the acrylic resin is calcinated by being baked at 230° C. for 20 minutes to form a leveling organic protective film FPAS of thickness 2.0 μm. A decrease in the thickness of the organic protective film FPAS occurs as the result of the solidification of the organic protective film FPAS due to reactions caused by light and heat. Subsequently, the through-hole pattern provided in the organic protective film FPAS is used as a mask to work the underlying SiN film with a reactive ion etching method using $CF_4$, thereby forming a second contact hole CNT2 in the SiN film. During this time, an opening CNT2 is also formed in a peripheral area to be coated with the sealing material SEL (FIGS. 10A and 10B).

In this manner, two layers of films can be patterned through one photolithography process by working the underlying insulating film by using the organic protective film FPAS as a mask, whereby the process can be simplified.

Figure 11A:
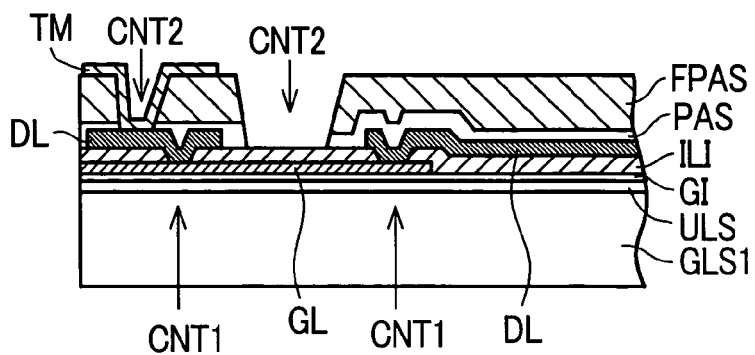
FIGS. 11A and 11B are cross-sectional views aiding in describing the manufacturing method of the TFT liquid crystal display device according to Embodiment 1 of the invention.
Figure 11B:
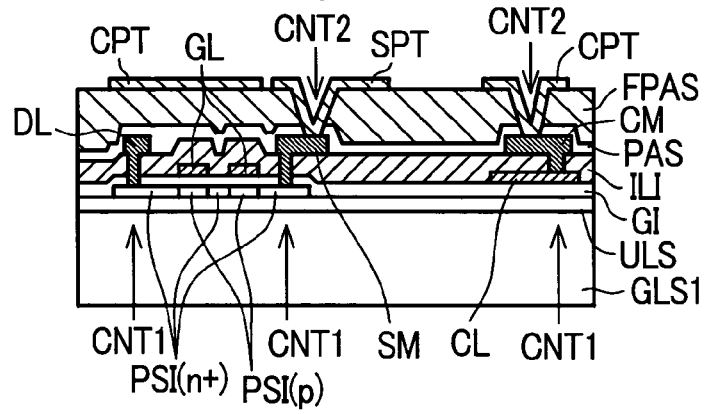

Finally, a transparent conductive film of thickness 70 nm, such as an ITO film, is formed by a sputtering method, and is worked into a predetermined shape by a wet-etching method using a mixed acid, to form the transparent common electrode CPT, the transparent pixel electrode SPT and the terminal electrode TM. Thus, an active matrix substrate is completed (FIGS. 11A and 11B). A polycrystalline silicon TFT is formed through six times photolithography process.

(Embodiment 2)

Figure 12:
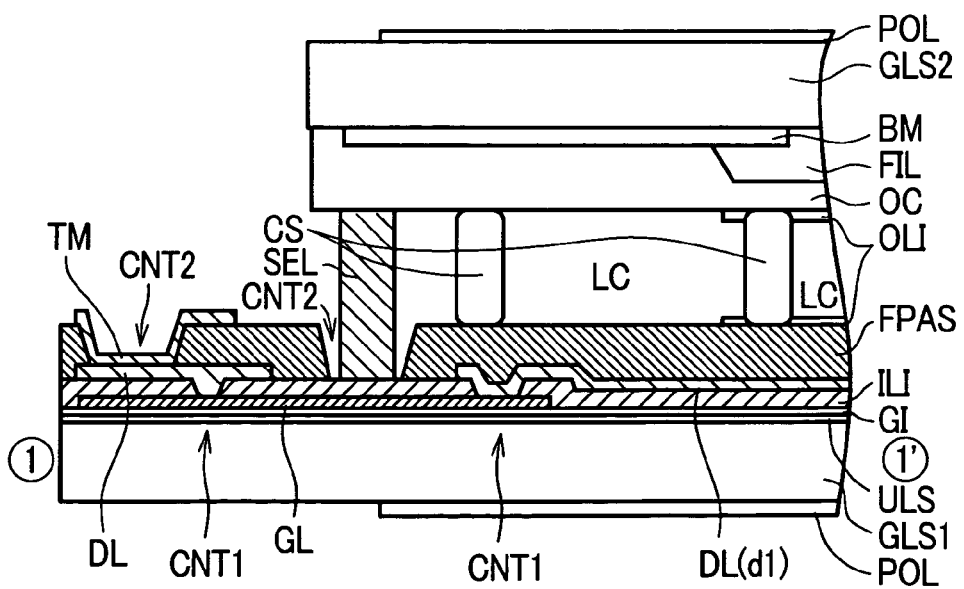
FIG. 12 is a cross-sectional view of a peripheral portion of a TFT liquid crystal display device according to Embodiment 2 of the invention.
Figure 13:
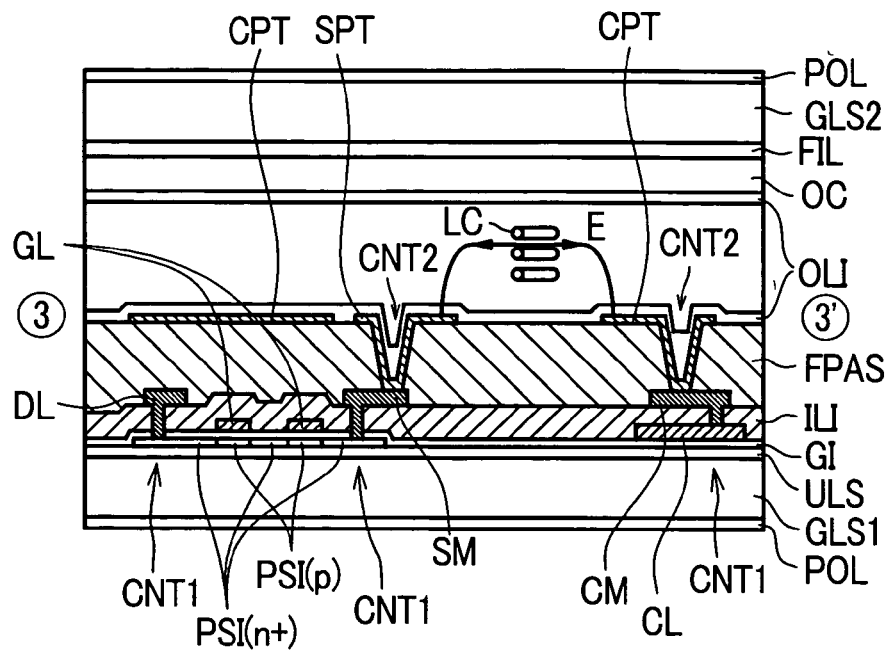
FIG. 13 is a cross-sectional view of the essential portion of a pixel of the TFT liquid crystal display device according to Embodiment 2 of the invention.

FIG. 12 is a cross-sectional view of a peripheral portion of a TFT liquid crystal display device according to Embodiment 2 of the invention, and FIG. 13 is a cross-sectional view of a pixel portion of the TFT liquid crystal display device according to Embodiment 2. As compared with Embodiment 1, a structural feature of Embodiment 2 resides in the fact that the protective film PAS for the thin film transistor TFT, which is formed of SiN film in Embodiment 1, is omitted.

Since the protective film PAS formed of SiN is omitted, it is possible to omit the process of forming the protective film PAS made of a SiN film of thickness 300 nm by a plasma CVD method and the process of working the protective film PAS by a reactive ion etching method using $CF_4$. Accordingly, it is possible to simplify the manufacturing process of the TFT liquid crystal display device and realize an improvement in yield due to a reduction in cost and a reduction in the required number of processes.

To realize the above-described structural modification, the interlayer insulating film ILI is desirably formed by a plasma CVD method using a mixed gas of $SiH_4$, $NH_3$ and $N_2$, unlike Embodiment 1 in which the interlayer insulating film ILI is formed of $SiO_2$. Accordingly, the interlayer insulating film ILI can serve the role of the protective film PAS of Embodiment 1, i.e., the role of supplying hydrogen to the polysilicon layer PSI shown in FIG. 13 and replacing dangling bonds in the grain boundaries thereof.

In addition, since the sealing material SEL is formed on the interlayer insulating film ILI in the peripheral portion, a high degree of adhesiveness of the sealing material SEL can be realized similarly to the case of Embodiment 1. In addition, the corrosion resistance of the terminal portion TM is retained at a high level since the metal material layer formed of the same material as the drain line DL underlying the terminal electrode TM is covered with the organic protective film FPAS.

(Embodiment 3)

Figure 14:
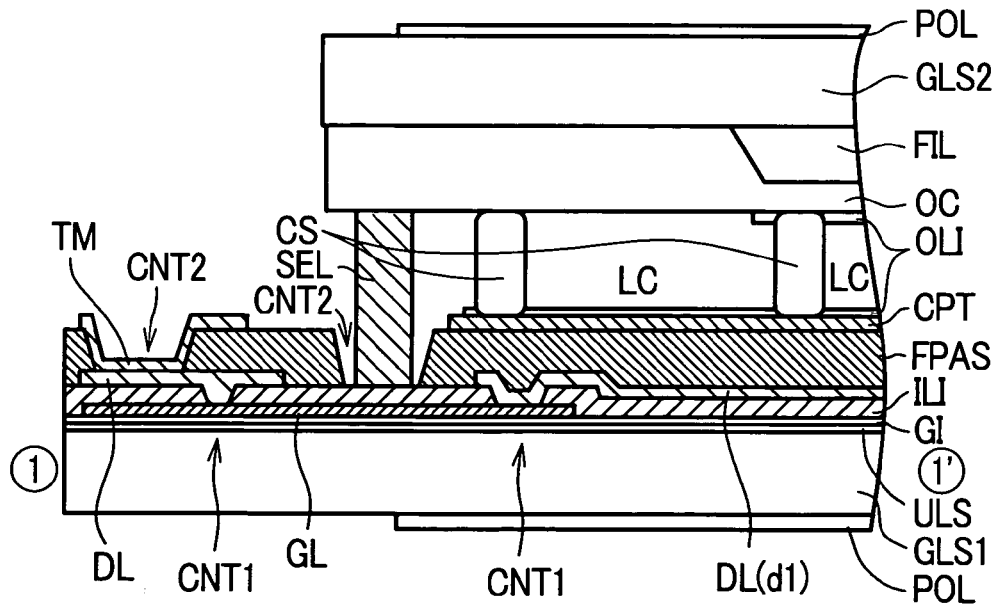
FIG. 14 is a cross-sectional view of a peripheral portion of a TFT liquid crystal display device according to Embodiment 3 of the invention.

FIG. 14 is a cross-sectional view of a peripheral portion of a TFT liquid crystal display device according to Embodiment 3 of the invention. A first feature of Embodiment 3 resides in the fact that the black matrix BM, which is formed in each of Embodiments 1 and 2, is omitted from the glass substrate GLS2. Accordingly, the cost required to construct the black matrix BM on the glass substrate GLS2 can be reduced. The omission of the process of forming the black matrix BM provides the advantage of reducing the required number of processes and improving yield. Although not shown, in Embodiment 3, no black matrix BM is formed in an area positioned on the polysilicon layer PSI in plan view. This is because the thin film transistor TFT formed of the polysilicon layer PSI has the characteristic of exhibiting no large increase in TFT leak current with respect to light irradiated from a backlight through the glass substrate GLS1 and external light such as indoor light incident from the glass substrate GLS2. Accordingly, in each of the liquid crystal display devices shown in FIGS. 1 and 12, the black matrix BM needs only to be formed in the peripheral portion which is not controlled in the liquid crystal display device, and it is not essential to shield the polysilicon layer PSI from light.

Accordingly, in Embodiment 3, the light shielding of the peripheral portion is realized by the following structure instead of the black matrix BM. First of all, the common electrode CPT formed of a transparent electrode is disposed with a large width on the glass substrate GLS1 in the peripheral portion. The width of the common electrode CPT is set to at least a value wider than the width of one pixel of the TFT liquid crystal display device according to Embodiment 3. In Embodiment 3, the minimum width is 100 μm or more, and the maximum width is 3 mm.

According to the installation of this transparent electrode CPT, the area of the alignment film OLI formed in each of the glass substrate GLS1 and the glass substrate GLS2 is extended. The alignment film OLI is also formed on the common electrode CPT in the peripheral portion. The polarizers POL are disposed in a crossed-Nicols state in the area of the ITO electrodes, the alignment films OLI are subjected to rubbing treatment so that the liquid crystal display device operates in a normally black mode.

The above-described structure has the following functions. The form of pixel area in this structure is based on the fact that the liquid crystal display device according to Embodiment 3 is a liquid crystal display device using a normally black mode, and can be selected from among types such as IPS types, FFS types, VA types, MVA types, PVA types, ASV types and OCB types. In the description of Embodiment 3, reference will be made to an IPS type as a representative example. In the IPS type, liquid crystal molecules do not move at locations where a lateral electric field is not applied. Accordingly, when the normally black mode is active, a light shielding state which does not allow transmission of light appears even on a transparent electrode. For this reason, in the peripheral portion shown in FIG. 13, liquid crystal molecules do not move over the common electrode CPT, whereby a light shielding state can be retained even if the metal film do not have a light shielding effect. The common electrode CPT is selected as the transparent electrode in the peripheral portion by way of example, but in the above-described principle, the pixel area need not necessarily be supplied with a common electrode potential, and needs only be constructed to be able to equivalently realize the state in which electric fields are absent. Accordingly, the state in which no electrodes are connected to a power source may also be substituted in potential terms. Otherwise, a floating state may also be substituted. This is because the liquid crystal layer over a floating area is placed in the state in which electric fields are absent. Similarly, Embodiment 3 can be applied to any type other than the IPS type.

The light shielding effect can be improved to a further extent by enhancing the light shielding effect by adding a black pigment to either or both of the spacers CS and the sealing material SEL. In particular, it is desirable to improve optical absorbance by the addition of a black pigment or a coloring pigment, because the black realizing effect of the normally black mode is decreased in the area of the sealing material SEL compared to the liquid crystal layer owing to the disturbance of the state of polarization due to irregular reflection of light in the sealing material SEL.

(Embodiment 4)

Figure 15:
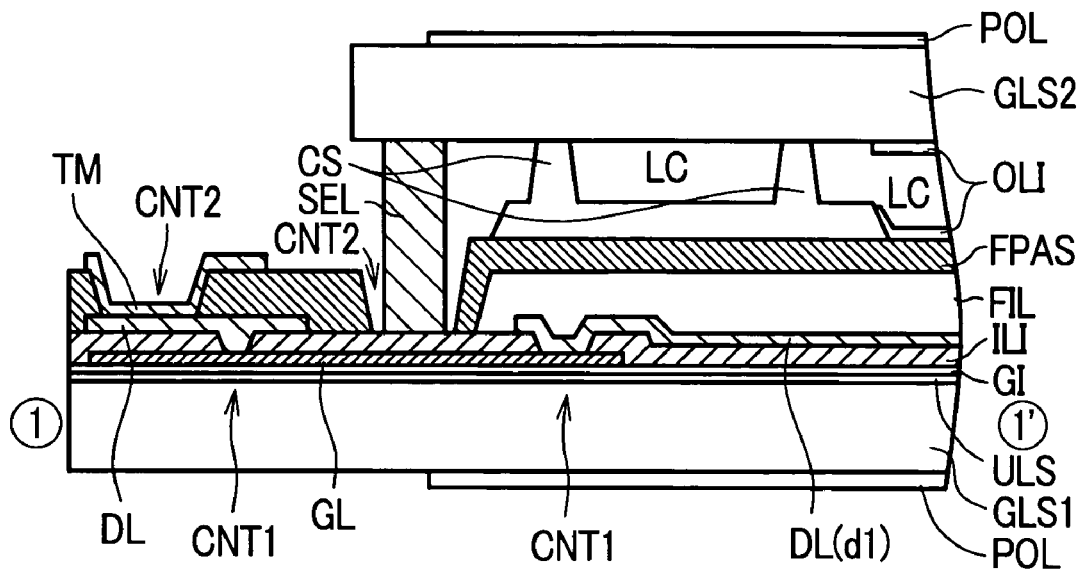
FIG. 15 is a cross-sectional view of a peripheral portion of a TFT liquid crystal display device according to Embodiment 4 of the invention.
Figure 16:
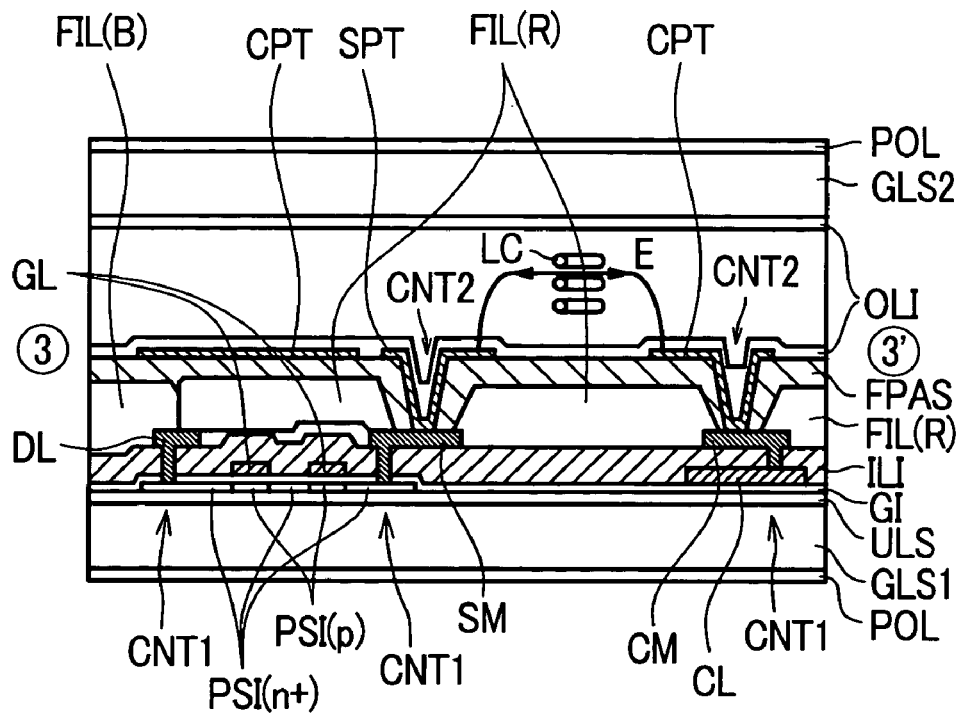
FIG. 16 is a cross-sectional view of the essential portion of a pixel of the TFT liquid crystal display device according to Embodiment 4 of the invention.

FIGS. 15 and 16 are cross-sectional views respectively showing a peripheral portion and a pixel portion of a liquid crystal display device according to Embodiment 4 of the invention. As compared with Embodiments 1 and 2 of the invention, the most outstanding feature of Embodiment 4 resides in the fact that the liquid crystal display device has a so-called color filter on TFT function in which its color filter function is collectively provided on the glass substrate GLS1.

As shown in FIG. 16, a color filter layer FIL is formed on the TFT glass substrate GLS1. The color filter layer FIL has different colors so that each of red (R), green (G) and blue (B) is assigned to any one of pixels, and the respective color filters of the color filter layer FIL are denoted by, for example, FIL(R), FIL(G) and FIL(B) (in FIG. 16, the color filter FIL(G) is not shown)). The boundary between each of the colors, for example, the boundary between red and blue is provided on the drain line DL. In FIG. 16, there is shown an example in which the boundary between the color filters glass FIL(B) and FIL(R) is disposed on the drain line DL. This construction prevents mixture of different colors. Color purity is adjusted according to the kinds of pigments to be incorporated, the quantities of the respective pigments and the thickness of the color filter layer FIL. Since the thickness of the color filter layer FIL differs for each of the colors, the organic protective film FPAS made of a transparent photosensitive organic material such as acrylic resin is formed to keep uniform the flatness of the color filter layer FIL. The liquid crystal molecules LC are driven by lateral electric fields between the pixel electrode SPT and the common electrode CPT which are formed so as to extend from the respective second contact holes CNT2 onto the organic protective film FPAS. Since the thin film transistor TFT formed of the polysilicon layer PSI does not produce a large leak current during irradiation with light, the black matrix BM is not formed even in any of the pixel portions of Embodiment 4. Since the color filter layer FIL is formed on the glass substrate GLS1 in the above-described manner, it is possible to restrain a decrease in aperture ratio due to a positional deviation between upper and lower substrates combined together, whereby it is possible to provide a bright liquid crystal display device.

The color filter layer FIL and the black matrix BM are not formed on the glass substrate GLS2 in the peripheral portion shown in FIG. 15. The light shielding of the peripheral portion is realized by the following structure. The spacer material CS is formed of a photosensitive organic film, and a black pigment or the like for enhancing a light shielding effect is added to the spacer material CS. This photosensitive material is a positive material (from which a portion irradiated with ultraviolet rays can be removed by development). A photomask to be used during exposure of the spacer material CS has the following features. The heights of the respective spacers CS are made equal to a predetermined value to keep uniform the liquid crystal gap in the pixel area and the peripheral portion shown in FIG. 15. In this portion, the photomask has a circular or rectangular pattern which blocks light by means of Cr or the like. Further, in the remaining transparent portion of the photomask, such a Cr pattern is not formed. With this photomask, the spacer material CS is applied, exposed, developed and removed. Then, a space pattern and a slit of Cr having a size close to the resolution limit of an exposure device to be used are employed as a mask which can control the amount of light to define the height of a non-spacer portion in a portion where the spacer material CS remains. This mask produces an area irradiated with the amount of light reduced by diffraction and interference of light compared to a portion which is not covered with the mask, i.e., half-tone exposure can be realized. When the spacer material CS is exposed with this mask, an area is produced which is reduced in thickness compared to the spacers CS for defining the liquid crystal gap. This area of reduced thickness serves the role of a black matrix in the peripheral portion. In the half-tone exposure method, by appropriately designing a photomask pattern, it is possible to form a plurality of areas having different thicknesses through one cycle of exposure and development. In addition, since two kinds of areas, i.e., the spacers CS which define the liquid crystal gap and the area of reduced thickness, are produced in the peripheral portion, it is possible to reduce contact resistance occurring when the upper and lower substrates are to be combined together, whereby it is possible to facilitate the manipulation of the substrates during positioning. Furthermore, it is possible to prevent the unit area of contact of the spacer CS with the opposed substrate from being extremely increased in the vicinity of the sealing material SEL as compared with the pixel area. If there is an area difference exceeding 100 times, the magnitude of pressure to be applied to determine the liquid crystal gap will extremely differ between the pixel area and the peripheral portion, and a correct gap will not be able to be obtained in the peripheral portion. This is because in the peripheral portion, since applied pressure is received by the spacers CS, the pressure per unit area becomes a value obtained by dividing the applied pressure by the unit area of the spacers CS.

(Embodiment 5)

Figure 17:
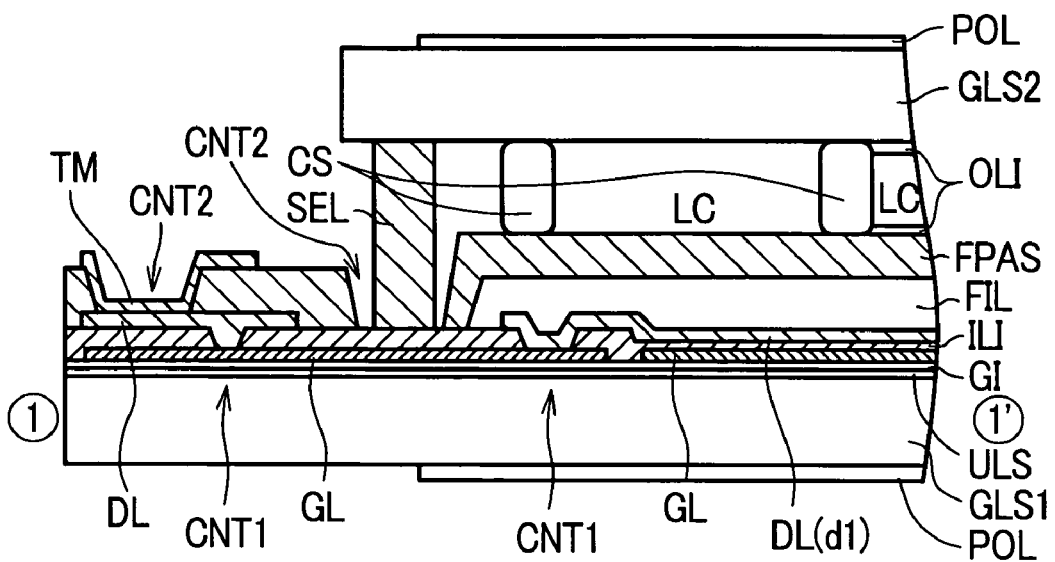
FIG. 17 is a cross-sectional view of a peripheral portion of a TFT liquid crystal display device according to Embodiment 5 of the invention.

FIG. 17 is a cross-sectional view showing the structure of a peripheral portion of a liquid crystal display device according to Embodiment 5 of the invention. Embodiment 5 relates to a liquid crystal display device having a color filter on TFT, and the feature of Embodiment 5 resides in the peripheral portion of the liquid crystal display device. In the pixel area (shown in the left-hand part of FIG. 17) on the TFT substrate GLS1, a metal material formed in the same process and the same material as the gate line GL is disposed under the drain line DL with the interlayer insulating film ILI interposed therebetween. In FIG. 17, the metal material is denoted by GL. This buried metal material GL is not supplied with the potential of the gate line GL, and is a floating electrode having a strip-like shape in plan view. Namely, Embodiment 5 utilizes only the light shielding effect of the metal material GL. The metal film is disposed in a nested state to cover in plan view the drain line DL extended at a predetermined distance apart from the metal film, with the interlayer insulating film ILI interposed therebetween. Accordingly, light incident from a backlight through the glass substrate GLS1 is blocked. The color filter layer FIL is formed to overlie the drain line DL. The polarizer POL is formed on the glass substrate GLS2. The effects of the arrangement of the color filter layer FIL and the polarizer POL are as follows. With only the nested structure of the metal electrode GL and the drain line DL on the TFT substrate GLS1, external light, i.e., metallic glossy reflection of light incident from the glass substrate GLS2, is viewed when the liquid crystal display device is observed from the glass substrate GLS2. This reflection can be reduced by disposing the color filter layer FIL in the peripheral portion. Furthermore, it is desirable to dispose a particular color which has the lowest transmissivity in the color filter layer FIL and, as a result, can lower reflection. In terms of this purpose, blue is desirable because blue has the lowest human visibility of all the three primary colors. The polarizer POL also has the effect of restraining reflection because the polarizer POL can reduce the amount of incident light.

(Embodiment 6)

Figure 18:
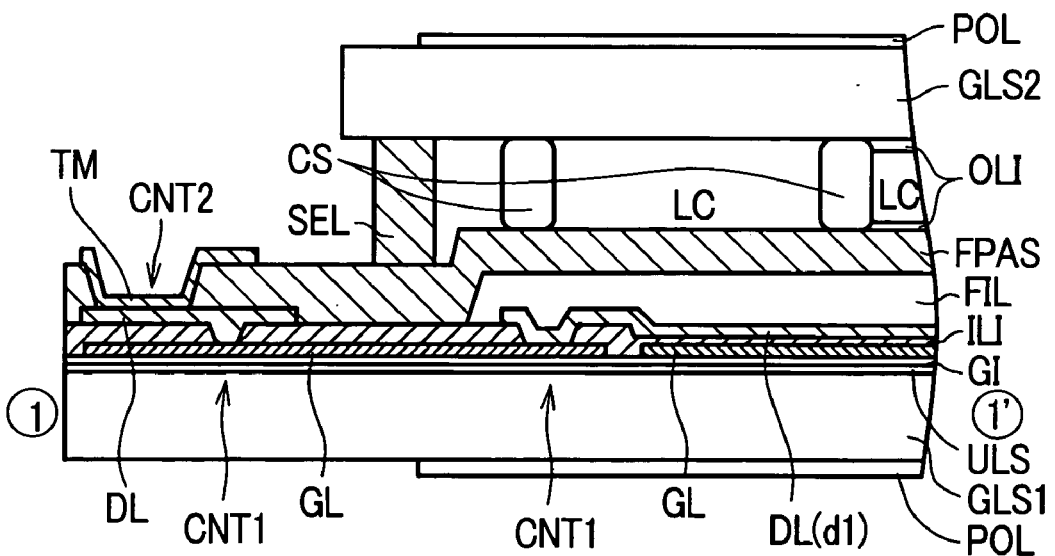
FIG. 18 is a cross-sectional view of a peripheral portion of a TFT liquid crystal display device according to Embodiment 6 of the invention.

FIG. 18 is a cross-sectional view showing the structure of a peripheral portion of a liquid crystal display device according to Embodiment 6 of the invention. As compared with the structure of Embodiment 3 shown in FIG. 14, a structural feature of Embodiment 6 resides in the fact that the overcoat film OC formed of an organic film is removed from the glass substrate GLS2.

The adhesion surface of the sealing material SEL that is located on the side of the glass substrate GLS2 faces the glass substrate GLS2 itself, whereby it is possible to improve the adhesion strength between the sealing material SEL and the glass substrate GLS2. In addition, the addition of a silane coupling material has an effect on the improvement of the adhesion strength because glass contains Si. Accordingly, although the adhesion surface of the sealing material SEL that is located on the side of the glass substrate GLS1 faces the organic protective film FPAS, the total adhesion strength can be made high. Since an organic film is removed from either one of the substrates GLS1 and GLS2, the adhesion surface of the glass substrate GLS1 may face the color filter layer FIL or the spacers CS having a light shielding effect enhanced by an added pigment as described above in connection with Embodiment 4. In addition, an inorganic film, for example, a $SiO_2$ film formed by a sputtering method may be provided on the glass substrate GLS2 to prevent ions from leaking through the glass substrate GLS2.

As is apparent from the foregoing detailed description, the invention can provide a liquid crystal display device in which the adhesion strength between its upper and lower substrates is high, the reliability of its terminals is high and the light shielding effect of its peripheral portion is high.

What is claimed is:

1. An active matrix type liquid crystal display device comprising:
    a liquid crystal layer interposed between a first substrate and a second substrate;
    a plurality of gate lines formed on the first substrate;
    a plurality of drain lines disposed on the first substrate in matrix form to intersect the plurality of gate lines;
    thin film transistors formed on the first substrate and respectively disposed to correspond to intersections of the gate lines and the drain lines; and
    a sealing material which causes the first substrate and the second substrate to adhere to each other along their peripheral portions,
    wherein each of the drain lines is connected to a metal material formed in the same process as the gate lines on a display-area side of the sealing material, is led under the sealing material as a metal material layer formed in the same process as the gate lines, and in an external-connection-terminal-side area outside the sealing material, is led from the metal material layer formed in the same process as the gate lines and is connected to an external connection terminal via a metal material layer formed in the same process as the drain lines, and
    an organic film formed as a protective film for the thin film transistor has an opening in an area under the sealing material in which each of the drain lines is led as the metal material layer formed in the same process as the gate lines, the sealing material in the area being adhered to an inorganic insulating film.

2. An active matrix type liquid crystal display device comprising:
    a liquid crystal layer interposed between a first substrate and a second substrate;
    a plurality of gate lines formed on the first substrate;
    a plurality of drain lines disposed on the first substrate in matrix form to intersect the plurality of gate lines;
    thin film transistors formed on the first substrate and respectively disposed to correspond to intersections of the gate lines and the drain lines; and
    a sealing material which causes the first substrate and the second substrate to adhere to each other along their peripheral portions,
    wherein each of the drain lines is connected to a metal material formed in the same process as the gate lines on a display-area side of the sealing material, is led under the sealing material as a metal material layer formed in the same process as the gate lines, and in an external-connection-terminal-side area outside the sealing material, is led from the metal material layer formed in the same process as the gate lines and is connected to an external connection terminal via a metal material layer formed in the same process as the drain lines, and
    a protective film for the thin film transistor is a stacked film made of an inorganic film formed of SiN and a photosensitive organic material, the stacked film made of the inorganic film and the photosensitive organic film having openings worked through one exposure cycle during formation of contact holes.

* * * * *